Oct. 22, 1935. F. J. LITTELL Re. 19,736

AUTOMATIC CENTERING REEL

Original Filed July 16, 1931 3 Sheets-Sheet 1

Witness:
R. B. Davison.

Inventor:
Frederick J. Littell.
By: Milburn, Hupley, Byrne & Knight
Attys.

Oct. 22, 1935. F. J. LITTELL Re. 19,736
AUTOMATIC CENTERING REEL
Original Filed July 16, 1931 3 Sheets-Sheet 2
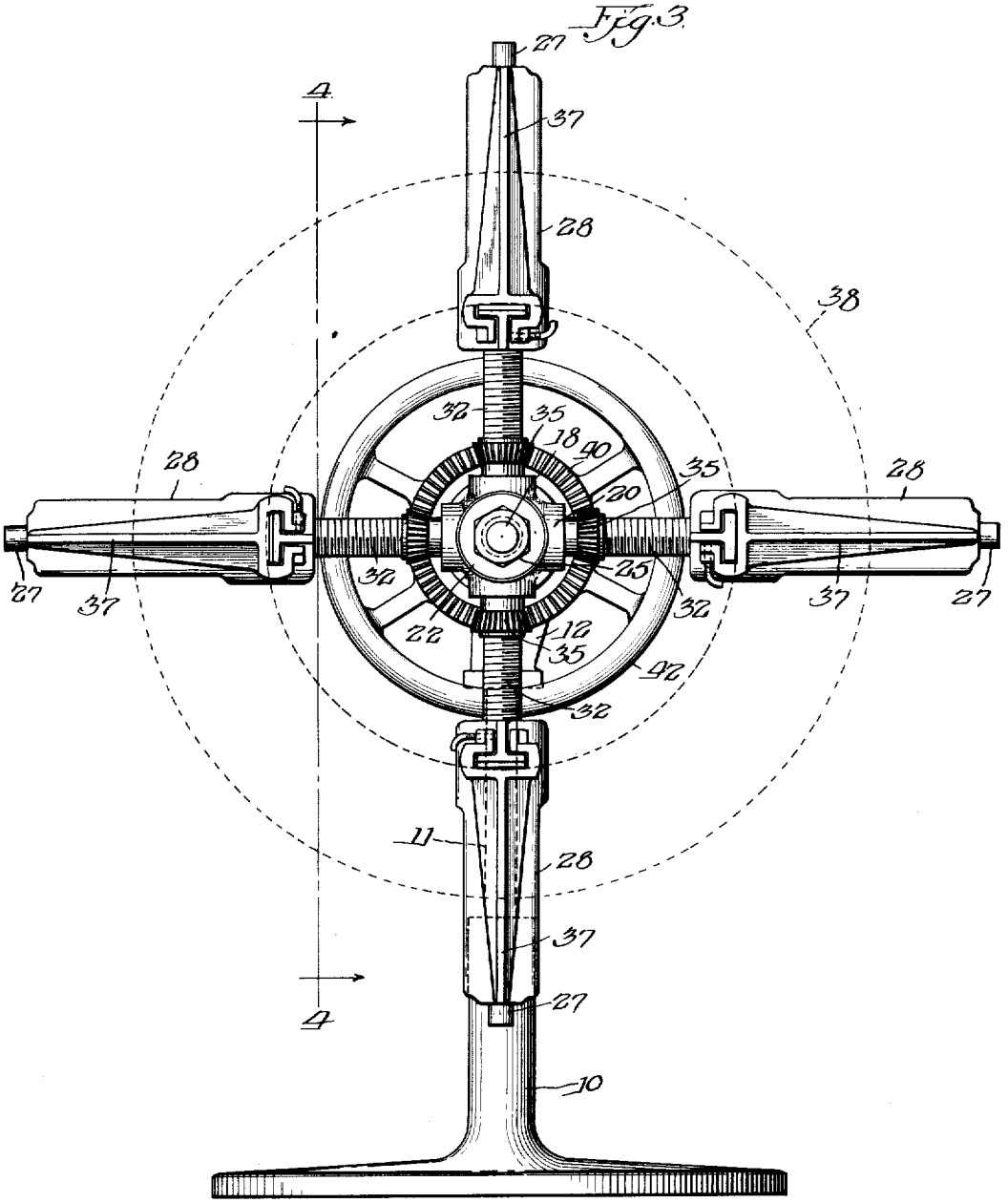
Witness:
R. B. Davison.
Inventor:
Frederick J. Littell,
By Wilkinson, Huxley, Byron & Knight
Attys.

Oct. 22, 1935. F. J. LITTELL Re. 19,736

AUTOMATIC CENTERING REEL

Original Filed July 16, 1931 3 Sheets-Sheet 3

Witness:
A. D. Davison

Inventor:
Frederick J. Littell

By: Wilkinson, Huxley, Byron & Knight
Attys.

Reissued Oct. 22, 1935

Re. 19,736

UNITED STATES PATENT OFFICE 19,736

AUTOMATIC CENTERING REEL

Frederick J. Littell, Chicago, Ill., assignor to F. J. Littell Machine Company, Chicago, Ill., a corporation of Illinois Original No. 1,885,613, dated November 1, 1932, Serial No. 551,121, July 16, 1931. Application for reissue October 25, 1934, Serial No. 750,023

9 Claims. (Cl. 242—110)

This invention relates to reels for supporting coils of stock and has reference more particularly to an automatic centering reel.

An object of the invention is to provide a reel for supporting a coil of stock in a manner to permit the same to unwind as it is being fed to punch presses and like machinery and which will run with practically no friction whatever and carry great lengths of coil stock without difficulty of any kind.

A further object is to provide an automatic centering reel wherein the arms can be simultaneously withdrawn to receive a coil of stock and given outward movement also simultaneously and of equal magnitude to accurately center the coil.

A further object is to provide a reel having the supporting arms mounted for radial movement in an improved manner, and which will embody novel mechanism for simultaneously actuating the arms.

A further object is the provision of a reel of the character described which will incorporate manually operated mechanism for causing actuation of the supporting arms, the mechanism having a lock associated therewith. This feature of locking the manually operated means permits actuation of the arms by rotation of the reel itself. Greater leverage is secured in this manner, which is highly desirable as some of the coils are heavy, whereby actuation of the arms by the manual means is almost impossible.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts:

Figure 3 is a front elevational view of the reel shown in Figure 1;

Figure 4:
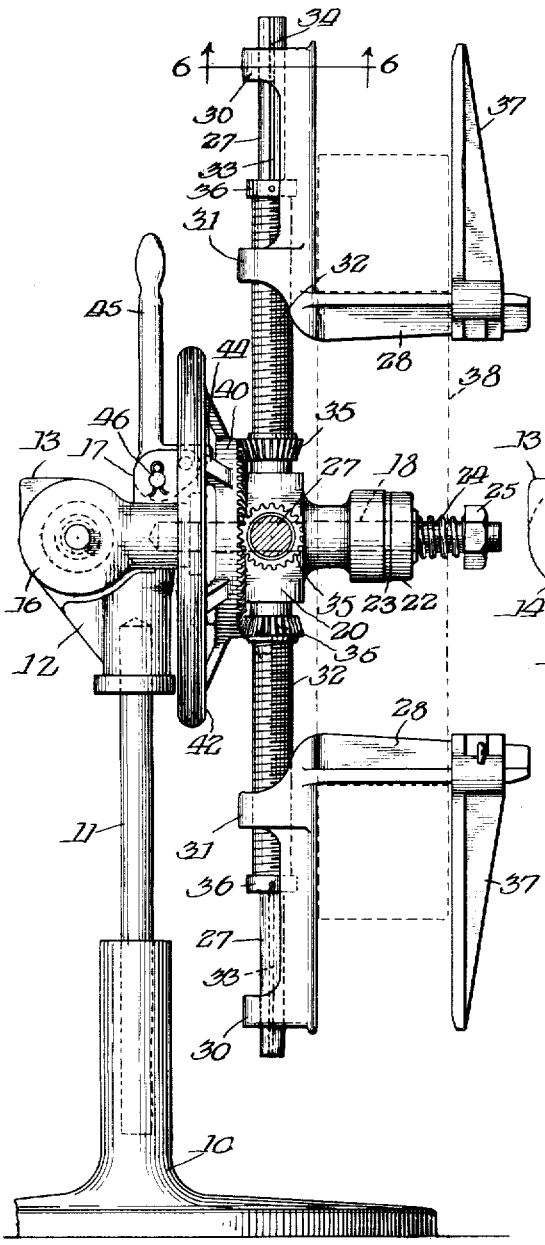
Figure 4 is a sectional view taken on the plane indicated by line 4—4 of Figure 3.
Figure 5:
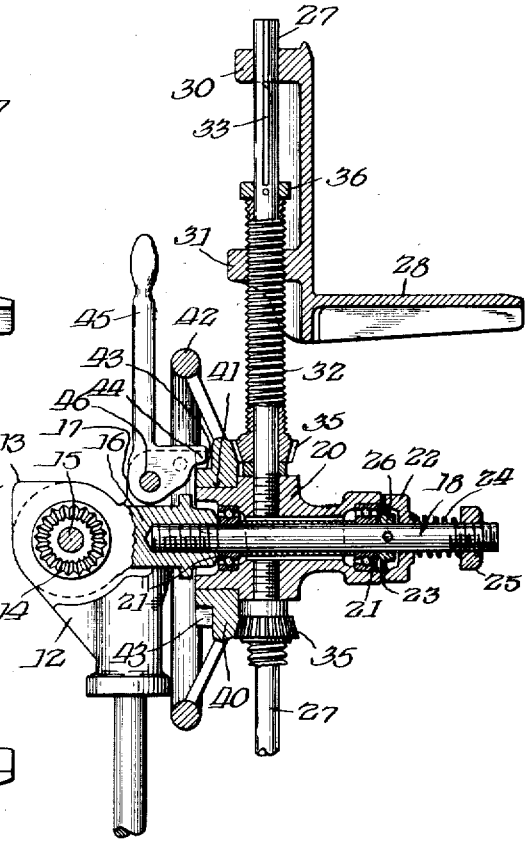
Figure 5 is a fragmentary sectional view showing the supporting and operating means for the arms.
Figure 6:
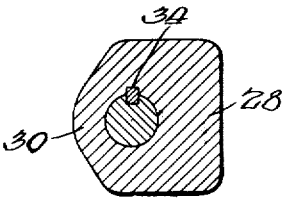
Figure 6 is a sectional view taken along the lines 6—6 of Figure 4.

The preferred embodiment of the invention comprises, as shown in Figure 4, a base 10 of fairly large diameter having mounted therein a standard 11 supporting at its upper end a vertical supporting knuckle 12, associated with the standard in such a manner that it is rotatable thereon. The knuckle 12 is provided with a horizontal abutment surface 13 and a plurality of notches 14 formed concentric with respect to a transverse shaft 15. Supported by the vertical knuckle 12 is a horizontal knuckle 16 having a vertical abutment surface 17 adapted to engage surface 13 when the same is located in its extreme vertical position, and provided with a plurality of notches 14 concentric with the shaft 15 and formed on its inner surface so as to cooperate with the notches 14 formed on the knuckle 12. By reason of the cooperating engagement of the notches 14 on the respective knuckles, the same can be adjustably positioned from the horizontal, as shown in Figures 4 and 5, to a vertical position where the abutment surfaces 13 and 17, respectively, engage.

The axis of the reel proper includes a projecting supporting shaft 18 suitably threaded to the knuckle 16 and having rotatably mounted thereon a hub 20. Ball bearing races 21 positioned on the shaft 18 and having engagement with the hub serve to frictionlessly mount the hub on the shaft, while a retarding means is provided for the hub including a cup-shaped member 22 and a friction washer 23 having engagement therewith, the parts being yieldingly urged into engagement with the hub by the coil spring 24 retained on the shaft 18 by a nut 25. A collar 26, located within the cup-shaped member 22, is suitably pinned to the shaft and functions to hold the hub member in position.

Projecting radially from the hub 20 are a plurality of rods or supporting members 27 suitably threaded to the hub and which function as supporting means for the right angled arms, designated in their entirety by 28. Spaced lugs 30 and 31 project from one leg of the arms 28, the upper lug receiving the uppermost end of the rod 27, while the lower lug 31 is threaded to an elongated screw 32 rotatably mounted on the rod. A groove 33 is provided at the upper end of the rod for engaging the key 34 fitted in lug 30, so that the arm is prevented from rotating with respect to the rod, allowing, however, vertical movement. The elongated screw 32 has integrally formed at its lower end a pinion 35 by means of which rotation is imparted to the screw, the same being held in position on the rod by means of a retaining collar 36. As the elongated screw has threaded engagement with lug 31 formed integrally with the arm, it will be seen that rotation of the screw will function to cause movement of the arm on the rod 27, the direction of movement being determined by the direction of rotation of the screw. The above structure is duplicated on each of the rods 27 so that the supporting arms 28, four of which are disclosed in the preferred embodiment, have movement toward the hub 20 or outwardly away from the hub, depending upon the particular direction of rotation given to the screws 32. As shown in Figure 4, each supporting arm 28 has adjustably fitted thereto a retaining arm 37 so that the coil of stock 38 mounted on the supporting arms is held in position thereon.

The operating means for imparting simultaneous rotation to the pinions 35 and thus to the screws 32 includes a bevelled gear 40 having meshing engagement with the pinions and mounted for rotation on portion 41 of the hub 20. Integral with the gear 40 is a hand wheel 42 by means of which the operator can impart rotation to the gear. For locking the gear 40 in position notches 43 are provided, located in spaced relation on the gear and adapted to receive lug 44 integral with the locking lever 45, pivoted to the knuckle 12 by means of stud 46. By actuation of the handle 45 the lug 44 can be withdrawn from a particular notch 43 to allow rotation of the hand wheel 42 and thus gear 40. Since the gear wheel is mounted for rotation on the hub 20 either of the parts may be rotated independently of the other. With the hub 20 and the projecting rods 27 carrying the supporting arms 28 being held stationary, it will be seen that rotation of the hand wheel 42 will impart rotation to pinions 35 and thus to the screws 32 to cause movement of the arms in a direction toward the hub or radially away from the hub as desired.

To position a coil of stock upon the supporting arms 28 the same are located by rotation of the hand wheel 42 in their centermost position so that the distance from the shaft 18 to any one of the arms forms a circle of less diameter than the interior diameter of the coil. With the arms in this position the coil of stock is lifted and positioned on the arms, the retaining arms 37 having been removed. Rotation is then imparted to the hand wheel 42 in a direction to cause outward travel of the arms, and since all of the arms travel outwardly an equal distance for any particular rotation of the hand wheel, it will be seen that the coil will be concentrically positioned with relation to the shaft 18. In order to permit the coil to unwind from the reel for the purpose of feeding the same to punch presses and like machinery, it is necessary to allow the reel and the gear wheel 40 to rotate together, which is possible since by the present construction the gear wheel is mounted and has rotation on the hub.

The locking lever 45 has been provided to cause locking of the operating means against rotation, as shown in Figure 5. With the parts in this position rotation of the gear wheel 40 to cause movement of the arms 28 is impossible but actuation of the arms is accomplished by rotation of the hub 20 and of course rods 27 and arms 28 carried thereby. The direction of rotation imparted to the hub determines the direction of movement of the arms. This feature is highly desirable at times since the coil of stock mounted on the arms is often of considerable weight, and to rotate the hand wheel 42 with the coil supported by the arms is, in these instances, almost impossible. The wheel may be locked, however, and by rotating the reel itself the coil can be centered thereon. Due to the fact that the leverage in this latter case is much greater, coils of stock of considerable weight can be accurately centered requiring very little work on the part of the operator.

Figure 2:
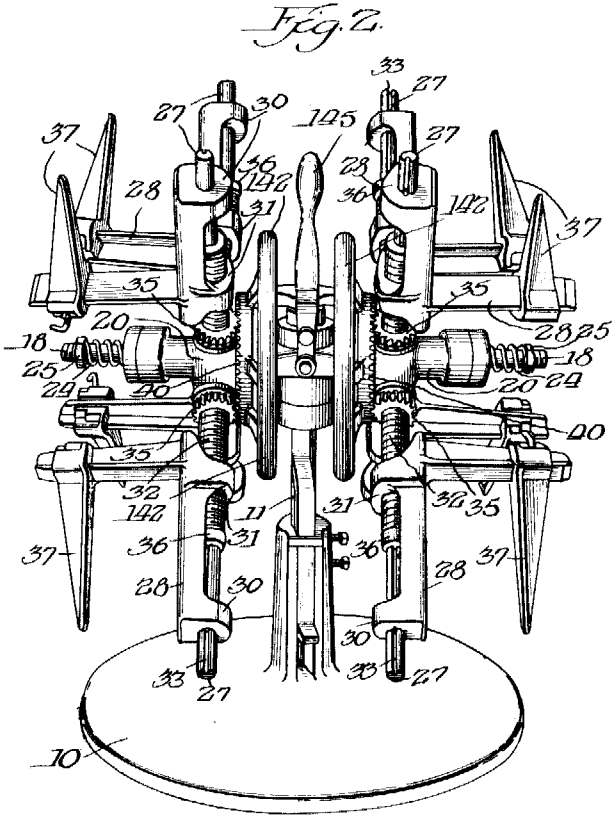
Figure 2 is a perspective view showing a modified form of arrangement including a double reel.
Figure 1:
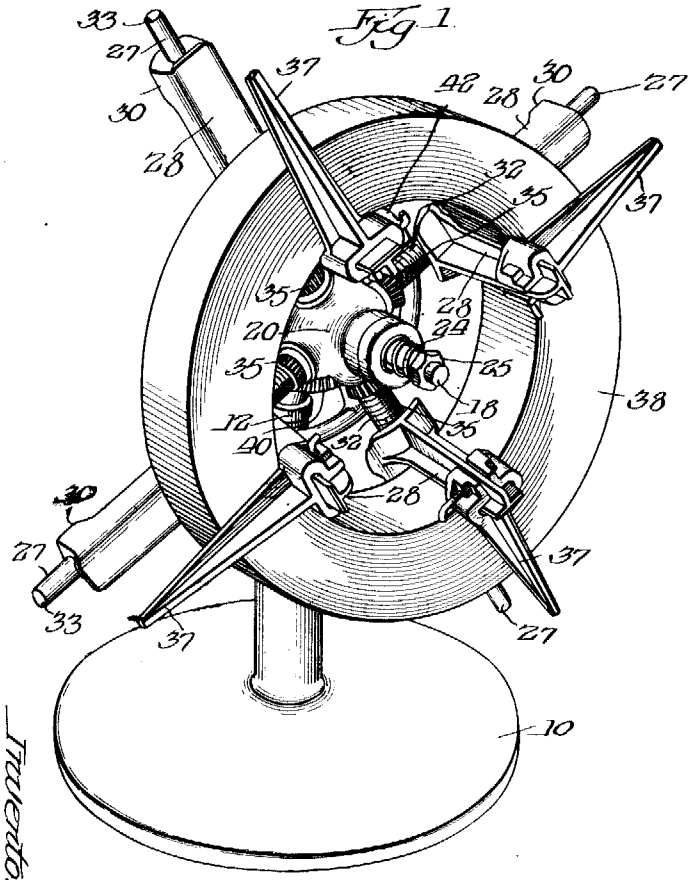
Figure 1 is a perspective view of a reel embodying the features of the present invention and shown as supporting a coil of stock.

In Figure 2 there is disclosed a modified arrangement consisting of a double reel positioned on the opposite sides of a suitable standard, each reel having a construction similar to that disclosed in the preferred embodiment. The reels are rotatably mounted on the standard with a single locking lever 145 being provided and adapted to have operative engagement with either of the hand operating wheels 142. With a device of this character, in operation one reel can support a coil of stock and while the same is being fed to a machine the other reel is free for loading. When operating the reel is not locked so that only one locking lever need be provided for the arrangement disclosed, the lever being only used when it is necessary to load the reel with a coil of stock and then only in those instances when the coil is unusually heavy.

In both modifications disclosed the locking lever may be spring pressed in a direction to hold it in neutral position. This is desirable since during rotation shaking or vibration of the support might cause the lever to drop into one of the notches to inadvertently lock the reel and impart actuation to the arms.

It is to be understood that I do not wish to be limited to the exact embodiment of the device shown, which is merely by way of illustration and not limitation, as various and other forms of the device will of course be apparent to those skilled in the art without departing from the spirit of the invention or the scope of the claims.

I claim:

1. A reel of the character described including, in combination, a base, a vertical support mounted in said base, a laterally projecting shaft pivotally mounted on the upper end of said support, a hub member mounted for rotation on the projecting shaft, members supported by the hub and projecting radially therefrom, arms mounted for movement on the members, elongated screws mounted for rotation on the members and threaded to the arms, means for simultaneously rotating said screws to actuate the arms including a rotatable gear wheel meshing with pinions integral with the screws, and a locking member for engaging means on the gear wheel to lock the wheel against rotation.

2. A reel of the character described, including in combination, a supporting standard, a hub having members projecting radially therefrom, a shaft journalling said hub and being pivotally secured to the standard, a supporting arm movably mounted on each member, a gear wheel provided with notches on one side and rotatably mounted on said hub, pinions on each member associated with an arm for moving said arm, said gear wheel meshing with the pinions for simultaneously actuating the pinions, and means adapted for location in the notches for locking said gear.

3. A reel of the character described, including in combination, a supporting standard, a hub having members projecting radially therefrom, a shaft journalling said hub and being secured to the standard, a supporting arm movably mounted on each member, a gear wheel for actuating the arms and being provided with spaced notches located on the face opposite the gear teeth, and a pivoted lever for location in the notches to lock the gear against rotation.

4. A reel of the character described, including in combination, a supporting standard, a laterally projecting shaft pivotally mounted on the upper end of said standard, a hub rotatable on said shaft and having members projecting radially therefrom, an elongated screw mounted for rotation on each radial member, a supporting arm associated with each radial member and with its respective elongated screw whereby said arms have movement on the radial members upon rotation of the elongated screws, means rotatable on said hub for causing rotation of said elongated screws, and locking means for locking said rotatable means against rotation.

5. A reel of the character described, including in combination, a supporting standard, a hub member mounted for rotation by said standard, a plurality of rods projecting radially from said hub member, an elongated screw mounted for rotation on each rod, a supporting arm for each radial rod having a pair of lugs projecting therefrom, one lug being non-rotatably mounted on the rod and the other lug having threaded engagement with the elongated screw, and means for causing rotation of said elongated screws.

6. A reel of the character described including, in combination, a supporting standard, a hub member mounted for rotation by said standard, a plurality of rods projecting radially from said hub member, an elongated screw mounted for rotation on each rod, a supporting arm for each radial rod having a pair of lugs projecting therefrom, one lug being non-rotatably mounted on the rod and the other lug having threaded engagement with the elongated screw, and a gear wheel rotatable on the hub for simultaneously actuating the elongated screws.

7. A device for supporting coils of stock comprising, in combination, a support, a journalling shaft secured to the upper end thereof, a reel mounted for rotation on said shaft, said reel including a plurality of radial rods, actuating means mounted for rotation on each rod, and a supporting arm associated with each rod for supporting the coil of stock, each arm having lugs projecting therefrom, one lug having slidable movement on the rod but being non-rotatable with respect thereto, and the other lug having connection with the actuating means.

8. A device for supporting coils of stock comprising, in combination, a reel including a plurality of radial rods, actuating means mounted for rotation on each radial rod, and L-shaped arms for supporting the coil of stock, one leg of each arm having a pair of spaced lugs formed thereon, one lug having connection with the actuating means on the rod and the other lug being mounted for slidable movement on the rod.

9. A device for supporting coils of stock comprising in combination, a support, a pair of shafts supported from the upper end and projecting horizontally outwardly therefrom at diametrically opposite points, a reel mounted for rotation on each of said shafts, each reel including a hub having a plurality of radial rods, an elongated screw mounted for rotation on each rod, a supporting arm associated with each radial member and with its respective elongated screw whereby said arms have movement on the radial members upon rotation of the elongated screws, means rotatable on each hub for causing rotation of said elongated screws, and a pivoted locking member positioned between said rotatable means and adapted to have locking engagement with either of said means.

FREDERICK J. LITTELL.